United States Patent
Tsai et al.

(10) Patent No.: US 10,234,603 B2
(45) Date of Patent: Mar. 19, 2019

(54) HEAD MOUNTED DISPLAY DEVICE

(71) Applicant: Coretronic Corporation, Hsin-Chu (TW)

(72) Inventors: Chih-Hsien Tsai, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 78 days.

(21) Appl. No.: 15/364,615

(22) Filed: Nov. 30, 2016

(65) Prior Publication Data

US 2017/0153662 A1 Jun. 1, 2017

(30) Foreign Application Priority Data

Dec. 1, 2015 (TW) .............................. 104140220 A

(51) Int. Cl.
| | | |
|---|---|---|
| *G06F 1/16* | (2006.01) | |
| *G02B 27/00* | (2006.01) | |
| *G02B 3/04* | (2006.01) | |
| *G02B 3/08* | (2006.01) | |
| *G02B 27/01* | (2006.01) | |

(52) U.S. Cl.
CPC ................ *G02B 3/04* (2013.01); *G02B 3/08* (2013.01); *G02B 27/0172* (2013.01)

(58) Field of Classification Search
CPC .. G06F 1/163; G02B 3/08; G02B 3/04; G02B 27/0172
See application file for complete search history.

(56) References Cited

U.S. PATENT DOCUMENTS

| | | | |
|---|---|---|---|
| 5,347,400 A | 9/1994 | Hunter | |
| 5,999,147 A | 12/1999 | Teitel | |
| 2004/0257663 A1 | 12/2004 | Edelmann | |
| 2009/0128919 A1 | 5/2009 | Kim | |
| 2013/0257689 A1* | 10/2013 | Hotta ................. | G02B 27/0172 345/8 |
| 2014/0340286 A1* | 11/2014 | Machida ............ | G02B 26/0833 345/8 |

(Continued)

FOREIGN PATENT DOCUMENTS

| | | |
|---|---|---|
| CN | 103261943 A | 8/2013 |
| CN | 104049369 A | 9/2014 |

(Continued)

*Primary Examiner* — Vinh T Lam

(57) ABSTRACT

A head mounted display device includes at least one display panel, two first lenses, two second lenses, and microstructures. The display panel is adapted to provide an image beam. The first lenses are disposed between the display panel and a focus area. Each first lens includes a first surface and a second surface. The second lenses are disposed between the first lenses and the focus area. The microstructures are disposed on at least one of the first surfaces and the second surfaces. Each first lens has an axis. The microstructures include a first microstructure group disposed close to the axis and a second microstructure group disposed away from the axis. A first angle is formed between any two adjacent microstructures in the first microstructure group, and a second angle is formed between any two adjacent microstructures in the second microstructure group. The first angle is greater than the second angle.

20 Claims, 9 Drawing Sheets

(56) References Cited

U.S. PATENT DOCUMENTS

| | | | | |
|---|---|---|---|---|
| 2015/0261008 A1* | 9/2015 | Fujii | ................. | G02B 3/08 |
| | | | | 351/159.01 |
| 2016/0286210 A1* | 9/2016 | Border | ............... | G02B 27/0176 |
| 2016/0320619 A1* | 11/2016 | Watanabe | .......... | G02B 27/0172 |
| 2017/0227190 A1* | 8/2017 | Fujikawa | ................ | F21V 5/045 |
| 2017/0232695 A1* | 8/2017 | Fujikawa | ................ | B29C 39/02 |
| | | | | 359/742 |
| 2018/0039069 A1* | 2/2018 | Huang | .................. | G02B 25/04 |

FOREIGN PATENT DOCUMENTS

| | | | |
|---|---|---|---|
| CN | 104808342 A | 7/2015 | |
| CN | 204595338 U | 8/2015 | |
| JP | H09113823 A | 5/1997 | |
| JP | 2001318339 A | 11/2001 | |
| JP | 2005316270 A | 11/2005 | |
| TW | M361635 U1 | 7/2009 | |
| TW | 201534971 A | 9/2015 | |

* cited by examiner

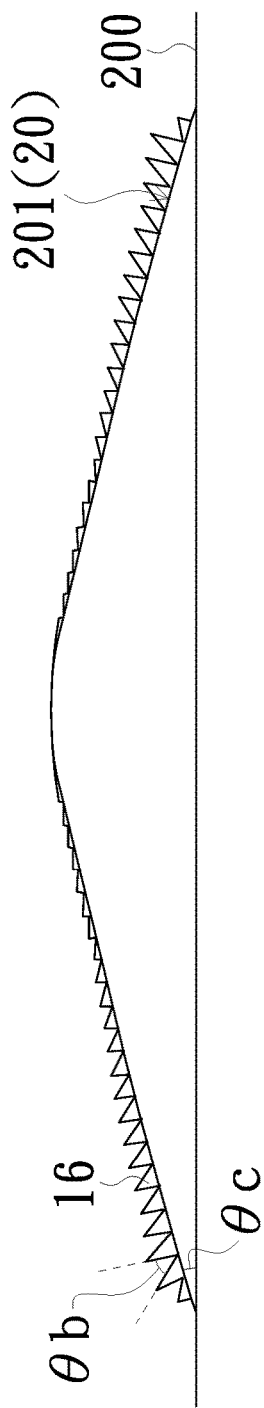

HEAD MOUNTED DISPLAY DEVICE

FIELD OF THE INVENTION

The invention relates to a head mounted display device, and more particularly to a head mounted display device with a wider field of view.

BACKGROUND OF THE INVENTION

Generally, when the current head mounted display device is applied to virtual reality, the image frames of display panel of the head mounted display device are projected to user's eyes through an optical system, so that a virtual image is formed in the user's eyes. With the rapid development of technology, head mounted display device has been widely used in some specific areas of recreational, driving and medical. Amblyopic patients or people wearing artificial retina watch screen images through wearing the head mounted display device.

Head mounted display device has two important specifications: field of view (FOV) which indicates a range allowing a user to watch an image and an eye relief which indicates a distance between the head mounted display device and the user's eyes. However, according to the current design structure of head mounted display device, the field of view is ranged between 100-110 degrees. The limited field of view is due to that the size of the lens in the optical system head mounted display device increases with the field of view; and as a result, the weight and component size of the head mounted display device increase. Further, the eye relief between the lens in the optical system and the user's eyes also increase with the field of view; as a result, a larger lens is required and the weight and component size of the head mounted display device increase. Therefore, it is quite important to overcome the aforementioned issues.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One object of the invention is to provide a head mounted display device configured to increase a field of view, and a weight and a size of the head mounted display device may be efficiently decreased.

Other objects and advantages of the invention may be further illustrated by the technical features broadly embodied and described as follows.

In order to achieve one or a portion of or all of the objects or other objects, the invention provides a head mounted display device adapted to emit an image beam and form a focus area on a transmission path of the image beam. The head mounted display device includes at least one display panel, two first lenses, two second lenses, and a plurality of microstructures. The at least one display panel is adapted to provide the image beam. The first lenses are adapted to allow the image beam to pass through, and disposed between the at least one display panel and the focus area. Each of the first lenses includes a first surface and a second surface, and the first surfaces are opposite to the second surfaces. Each of the first surfaces is a concave surface facing the focus area. The second lenses are adapted to allow the image beam to pass through, and each of the first lenses is disposed between each of the second lenses and the focus area. The microstructures are disposed on at least one of the first surfaces and the second surfaces. Each of the first lenses has an axis. The microstructures include a first microstructure group disposed close to the axis and a second microstructure group disposed away from the axis. A first angle is formed between any two adjacent microstructures in the first microstructure group. A second angle is formed between any two adjacent microstructures in the second microstructure group. The first angle is greater than the second angle.

In one embodiment, each of the first lenses has a positive refractive power.

In one embodiment, each of the second surfaces is a convex surface.

In one embodiment, the microstructures have a positive refractive power.

In one embodiment, the microstructures have a negative refractive power.

In one embodiment, each of the second lenses includes a third surface and a fourth surface. The third surfaces are opposite to the fourth surfaces. The microstructures are disposed on at least one of the third surfaces and the fourth surfaces. Each of the second lenses has a negative refractive power.

In one embodiment, the third surface of the at least one second lens is a concave surface. The fourth surface of the at least one second lens is a convex surface. One of the third surface having the concave surface and the fourth surface having the convex surface faces the focus area.

In one embodiment, the third surface of the at least one second lens is a first concave surface. The fourth surface of the at least one second lens is a second concave surface. One of the first concave surface and the second concave surface faces the focus area.

In one embodiment, the third surface of the at least one second lens is a concave surface. The fourth surface of the at least one second lens is a plane surface. One of the third surface having the concave surface and the fourth surface having the plane surface faces the focus area.

In one embodiment, the third surface of the at least one second lens is a first plane surface. The fourth surface of the at least one second lens is a second plane surface. One of the first plane surface and the second plane surface faces the focus area.

In one embodiment, at least one of the first lenses is a spherical lens.

In one embodiment, at least one of the first lenses is an aspheric lens.

In one embodiment, at least one of the second lenses is a spherical lens.

In one embodiment, at least one of the second lenses is an aspheric lens.

In one embodiment, at least a portion of a surface of the microstructures is a spherical surface.

In one embodiment, at least a portion of a surface of the microstructures is an aspheric surface.

In one embodiment, the aforementioned head mounted display device further includes at least one optical compensation lens adapted to allow the image beam to pass through and disposed between the at least one display panel and the second lenses.

In one embodiment, the at least one display panel inclines towards a direction by facing the focus area from a reference plane to form a third angle formed between the at least one display panel and the reference plane. At least one of the first lenses further includes a first side and a second side, the first side is opposite to the second side. The first side and the second side are adjacent between the corresponding first surface and the corresponding second surface. The head mounted display device further includes a first reference line and a second reference line. The first reference line passes through the axis of one of the first lenses and a center point of the focus area. The second reference line passes through the first side and the center point of the focus area or passes through the second side and the center point of the focus area. A fourth angle is formed between the first reference line and the second reference line, and the fourth angle is greater than the third angle.

In one embodiment, the number of the at least one display panel is two. The display panels are adapted to provide a first image beam and a second image beam respectively. The first image beam passes through one of the first lenses and one of the second lenses corresponding to each other to form a first focus area on a transmission path of the first image beam. The second image beam passes through another one of the first lenses and another one of the second lenses corresponding to each other to form a second focus area on a transmission path of the second image beam.

In one embodiment, the aforementioned head mounted display device further includes a frame. The at least one display panel, the first lenses, and the second lenses are disposed on the frame.

In summary, in the head mounted display device of the embodiment of the invention, the first lens close to the focus area formed by the image beam is designed as a curved surface, the concave surface of the first lens is designed to face the focus area, and a plurality of microstructures are designed to be disposed on the curved surface of the first lens, through the design, the field of view of the head mounted display device of the embodiment of the invention may be wider than 110 degrees without enlarging the size of lens. In addition, in the head mounted display device of the embodiment of the invention, the eye relief may be maintained greater than 100 mm while the field of view is increased. Further, the head mounted display device of the embodiment of the invention has lighter weight and smaller component size. Moreover, in the head mounted display device of the embodiment of the invention, though the structural design, the chromatic aberration and the aberration of the optical system may be corrected effectively.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A is a schematic view of a plurality of microstructures formed in a reference plane;

FIG. 2B is a schematic view of the microstructures in FIG. 2A disposed on a curved lens;

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
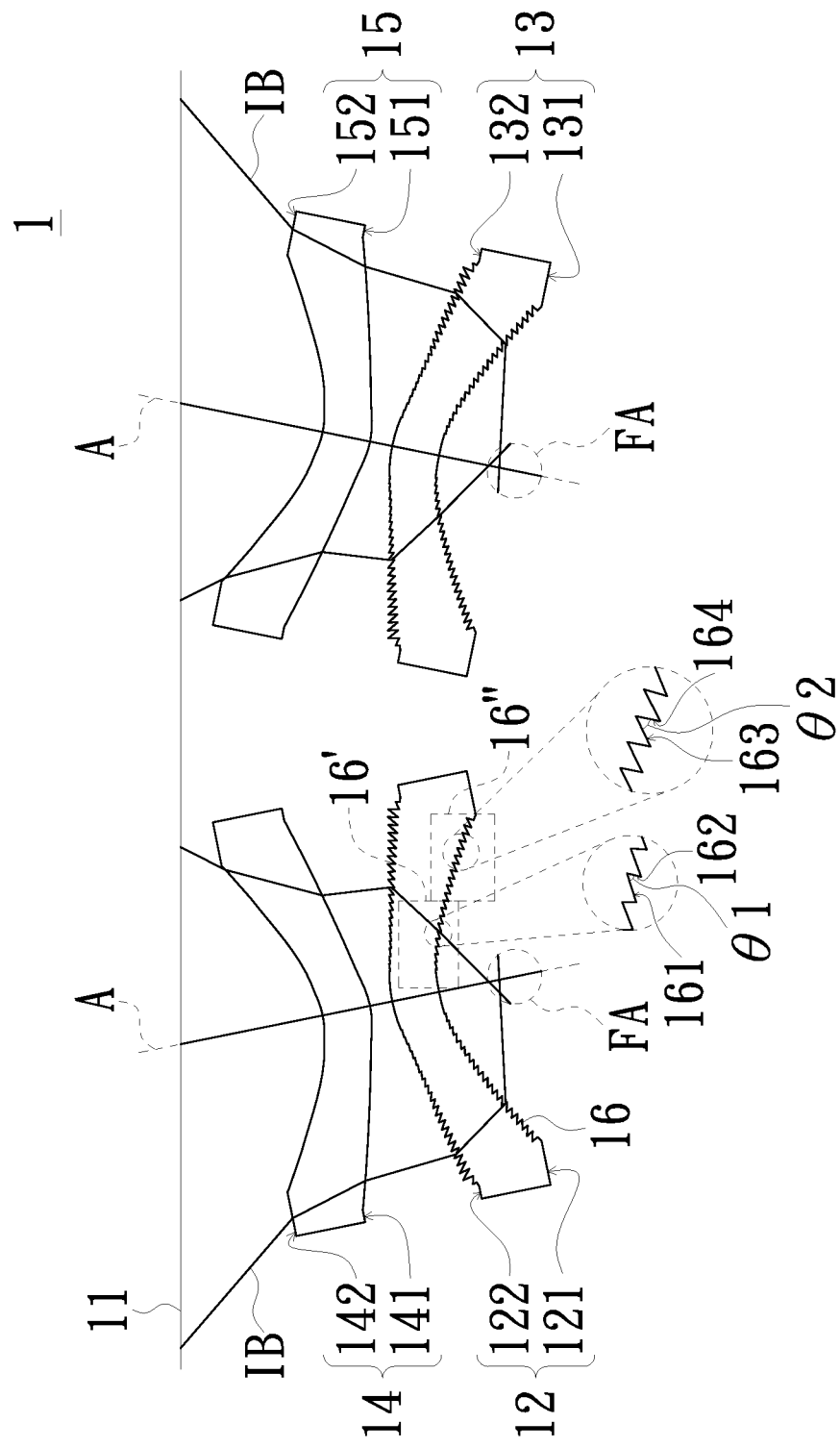
FIG. 1 is a schematic view of a head mounted display device in accordance with an embodiment of the invention.

FIG. 1 is a schematic view of a head mounted display device in accordance with an embodiment of the invention. Referring to FIG. 1, the head mounted display device 1 of the embodiment includes at least one display panel 11, two first lenses 12 and 13, two second lenses 14 and 15, and a plurality of microstructures 16. The display panel 11 is adapted to provide an image beam IB and form a focus area FA on the transmission path of the image beam IB. The first lenses 12 and 13 are adapted to allow the image beam IB to pass through and are disposed between the display panel 11 and the focus area FA. The first lens 12 has a first surface 121 and a second surface 122, the first lens 13 has a first surface 131 and a second surface 132, and the first surfaces 121 and 131 are opposite to the second surfaces 122 and 132. In the embodiment, the first surfaces 121 and 131 are concave surfaces facing the focus area FA; and the second surfaces 122 and 132 are convex surfaces facing the display panel 11. The second lenses 14 and 15 are adapted to allow the image beam IB to pass through; the first lens 12 is disposed between the second lens 14 and the focus area FA; and the first lens 13 is disposed between the second lens 15 and the focus area FA. The second lens 14 has a third surface 141 and a fourth surface 142, and the third surface 141 and the fourth surface 142 are opposite to each other. The second lens 15 has a third surface 151 and a fourth surface 152, and the third surface 151 and the fourth surface 152 are opposite to each other. In the embodiment, the third surface 141 of the second lens 14 and the third surface 151 of the second lens 15 are convex surfaces; and the fourth surface 142 of the second lens 14 and the fourth surface 152 of the second lens 15 are concave surfaces. That is, in the embodiment, the second lens 14/15 is a convex-concave lens. In the embodiment, the convex surfaces of the second lenses 14 and 15 face, for example, the focus area FA, and the concave surfaces of the second lenses 14 and 15 face, for example, the display panel 11; but the invention is not limited thereto. In another embodiment, the convex surfaces of the second lenses 14 and 15 face, for example, the display panel 11; and the concave surfaces of the second lenses 14 and 15 face, for example, the focus area FA.

As shown in FIG. 1, the microstructures 16 are disposed on at least one of the first surface 121/131 and the second surface 122/132 of the first lens 12/13. In the embodiment, the microstructures 16 are disposed on, for example, the first surface 121/131 and the second surface 122/132 of the first lens 12/13 to reduce the thickness of the first lens 12/13 has reduced thickness, but the invention is not limited thereto. In another embodiment, the microstructures 16 are disposed only on the first surface 121/131 (i.e., the concave surface) of the first lens 12/13. In still another embodiment, the microstructures 16 are disposed only on the second surface 122/132 (i.e., the convex surface) of the first lens 12/13.

The following description is described based on the microstructures 16 disposed on the first surface 121 of the first lens 12. As shown in FIG. 1, the microstructures 16 of the embodiment include a first microstructure group 16' and a second microstructure group 16". In the embodiment, the first microstructure group 16' is disposed close to the axis A of the first lens 12 and the second microstructure group 16" is disposed away from the axis A of the first lens 12. That is, in the embodiment, the first microstructure group 16' is disposed between the axis A of the first lens 12 and the second microstructure group 16". In the embodiment, the first microstructure group 16', a first angle $\theta 1$ is formed between any two adjacent microstructures 16; in the second microstructure group 16", a second angle $\theta 2$ is formed between any two adjacent microstructures 16; wherein the first angle $\theta 1$ is greater than the second angle $\theta 2$. Through the design, the first lens 12 of the embodiment may improve refractive degree at the edge thereof and maintain qualified images, compared with the conventional technology; so that field of view (FOV) of a user may be wider than 110 degrees. To be more specific, in the first microstructure group 16', any two adjacent microstructures 16 have a surface 161 and a surface 162 adjacent to each other, respectively; wherein the first angle $\theta 1$ is formed between the surface 161 and the surface 162. In the second microstructure group 16", any two adjacent microstructures 16 have a surface 163 and a surface 164 adjacent to each other, respectively; wherein the second angle $\theta 2$ is formed between the surface 163 and the surface 164. In addition, it is understood that the microstructures 16 disposed on the first surface 131 of the first lens 13 may also have the above-described structure design.

It is to be noted that the microstructures 16 shown in FIG. 1 may have the angle relationships as shown in FIGS. 2A and 2B, the detail will be described in the following.

FIG. 2A is a schematic view of a plurality of microstructures formed in a reference plane. FIG. 2B is a schematic view of the microstructures in FIG. 2A disposed on a curved lens. As shown in FIG. 2A, the reference plane 100 is a horizontal plane, and an angle $\theta a$ is formed between any two adjacent microstructures 16 of the microstructures 16 in the reference plane 100. As shown in FIG. 2B, when the microstructures 16 are disposed on the convex surface 201 of the curved lens 20, the angle $\theta a$ (in FIG. 2A) between any two adjacent microstructures 16 at the same position is changed to angle $\theta b$ (in FIG. 2B); wherein the angle $\theta b$ is greater than the angle $\theta a$. Further, as shown in FIG. 2B, an angle $\theta c$ is formed between the convex surface 201 of the curved lens 20 and another reference plane 200. The reference plane 200 (in FIG. 2B) and the reference plane 100 (in FIG. 2A) are parallel to each other; and regarding the angles $\theta a$, $\theta b$, and $\theta c$, the angle $\theta c$ is substantially equal to the sum of the angle $\theta a$ and the angle $\theta b$.

Please refer to FIG. 1 again. In the embodiment, the first lens 12/13 of the head mounted display device 1 has a positive refractive power; that is, the first lens 12/13 is a positive lens. The second lens 14/15 of the head mounted display device 1 has a negative refractive power; that is, the second lens 14/15 is a negative lens. Additionally, in the embodiment, the microstructures 16 may, for example, have a positive refractive power; but the invention is not limited thereto. In another embodiment, the microstructures 16 may, for example, have a negative refractive power. However, in the embodiment of the microstructures 16 having a negative refractive power, although the refractive power(s) of the microstructures 16 is(are) negative, the overall refractive power of the first lenses 12 and 13 is still positive after the microstructures 16 with negative refractive power are combined with the first lens 12/13 with positive refractive power. Additionally, in the embodiment, the microstructures 16 may have, for example, a Fresnel lens structure/Fresnel lens structures, but the invention is not limited thereto. In another embodiment, the microstructures 16 may have, for example, a diffraction structure/diffraction structures.

Please continue to refer to FIG. 1. In the embodiment, the first lens 12/13 of the head mounted display device 1 is, for example, a spherical lens; in another embodiment, the first lens 12, 13 may be an aspheric lens; namely, the type of the first lens is not limited in the invention and is selectable according to actual requirements. Further, in the embodiment, the second lens 14/15 of the head mounted display device 1 is a spherical lens; in another embodiment, at least one of the second lenses 14 and 15 is a spherical lens; in some embodiment, at least one of the second lenses 14 and 15 is an aspheric lens; namely, the type of the second lens(es) is(are) not limited in the invention and is(are) selectable according to actual requirements. Further, in the embodiment, the surfaces of the microstructures 16 are, for example, spherical surfaces; in another embodiment, the surfaces of the microstructures 16 may be aspheric surfaces; namely, the type of the microstructures are not limited in the invention and are selectable according to actual requirements.

However, when a user wares the head mounted display device 1 of the embodiment on his/her head, the focus area FA formed on the transmission path of the image beam 1B provided by the display panel 11 is, for example, the position of the user's eyes; but the invention is not limited thereto. Regarding the point of view of optical system architecture, the focus area FA formed on the transmission path of the image beam 1B is, for example, the position of pupil, that is, aperture stop for example. The aperture stop is an optical element for limiting the light beam passing through an optical system and also limiting the size or the range of spatial dimension of the imaging. Further, in the embodiment, the display panel 11, the first lens 12/13, and the second lens 14/15 of the head mounted display device 1 are, for example, disposed on a frame (not shown in FIG. 1).

Figure 3:
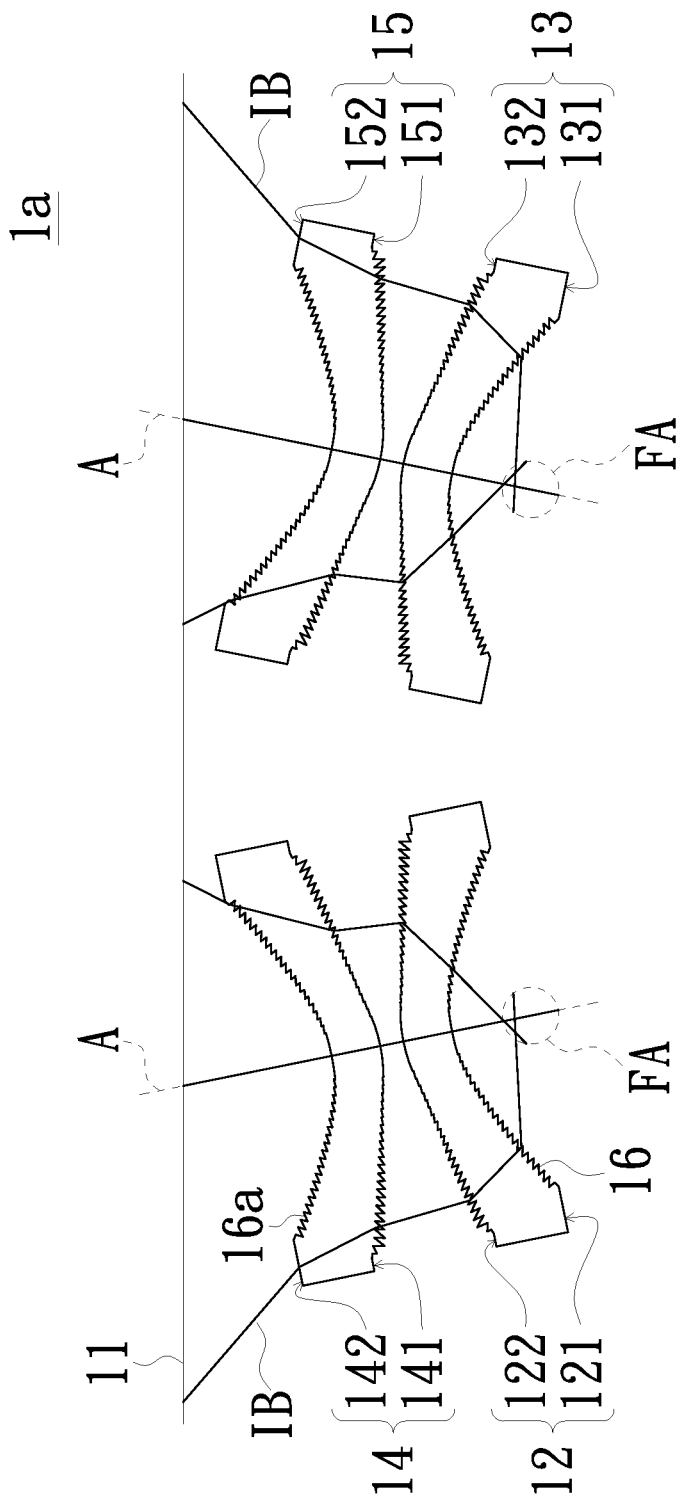
FIG. 3 is a schematic view of a head mounted display device in accordance with another embodiment of the invention.

Referring to FIG. 3, FIG. 3 is a schematic view of a head mounted display device in accordance with another embodiment of the invention. The head mounted display device 1a of FIG. 3 of the embodiment is substantially similar to the head mounted display device 1 of FIG. 1. A main difference lies in that a plurality of microstructures 16a is also disposed on the second lens 14/15 of the head mounted display device 1a. Specifically, the microstructures 16a are disposed on at least one of the third surface 141/151 and the fourth surface 142/152 of the second lens 14/15, so that the thickness of the second lens 14/15 may be reduced. In the embodiment, the microstructures 16a are, for example, disposed on the third surfaces 141 and 151 and the fourth surfaces 142 and 152 of both of the second lenses 14 and 15, but the invention is not limited thereto. In another embodiment, the microstructures 16a are, for example, disposed only on the third surface 141/151 (i.e., the convex surface) of the second lens 14/15. In still another embodiment, the microstructures 16a are, for example, disposed only on the fourth surface 142/152 (i.e., the concave surface) of the second lens 14/15.

Figure 4:
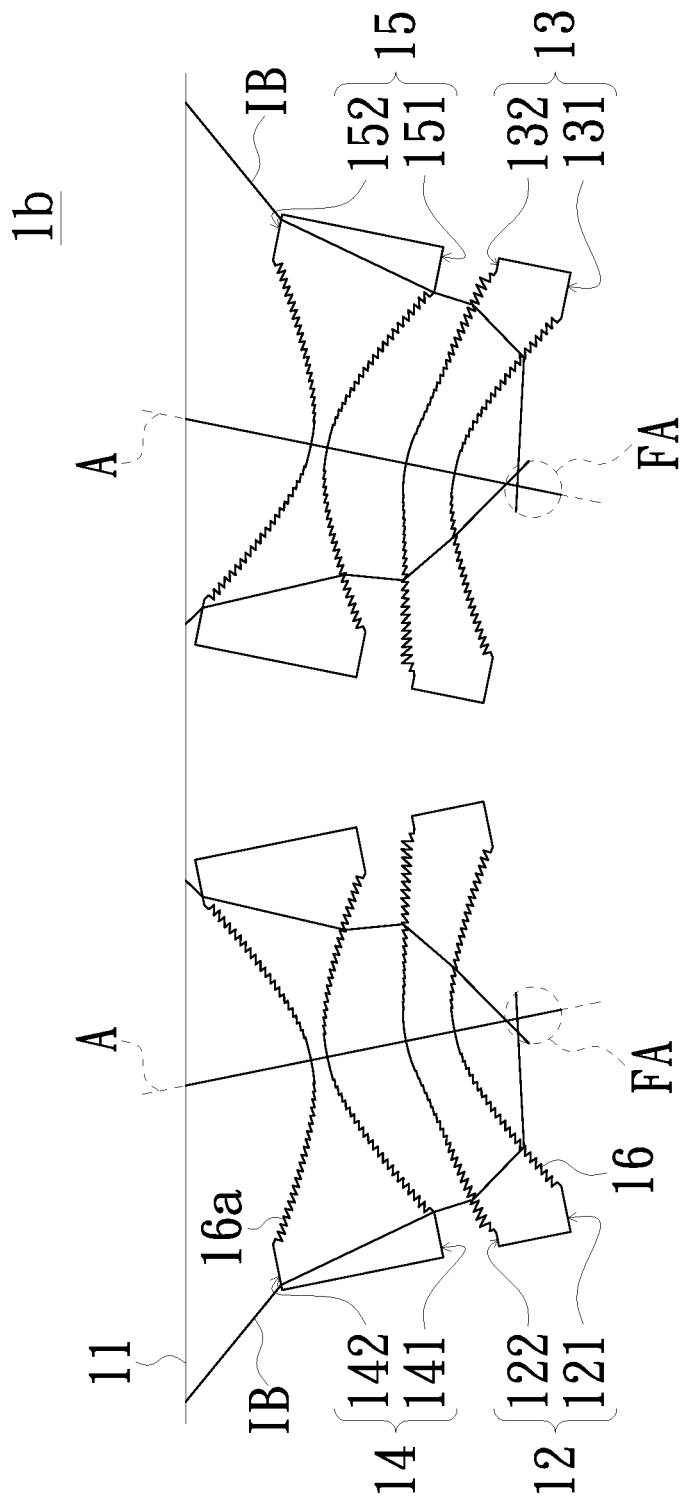
FIG. 4 is a schematic view of a head mounted display device in accordance with another embodiment of the invention.

Referring to FIG. 4, FIG. 4 is a schematic view of a head mounted display device in accordance with another embodiment of the invention. The head mounted display device 1b of FIG. 4 of the embodiment is substantially similar to the head mounted display device 1a of FIG. 3. A main difference lies in that the third surface 141b/151b of the second lens 14b/15b of the head mounted display device 1b of the embodiment is a first concave surface, the fourth surface 142b/152b of the second lens 14b/15b is a second concave surface. Namely, in the embodiment, the second lens 14b/15b is, for example, a biconcave (concave-concave) lens with negative refractive power. Specifically, in the embodiment, the first concave surface of the second lens 14b/15b faces, for example, the focus area FA, and the second concave surface of the second lens 14b/15b faces, for example, the display panel 11; but the invention is not limited thereto. In another embodiment, the first concave surface of the second lens 14b/15b faces, for example, the display panel 11, and the second concave surface of the second lens 14b/15b faces, for example, the focus area FA. Further, it is understood that the microstructures 16a may be selectively disposed on at least one of the third surface 141b/151b and the fourth surface 142b/152b of the second lens 14b/15b, and the invention is not limited thereto.

Figure 5:
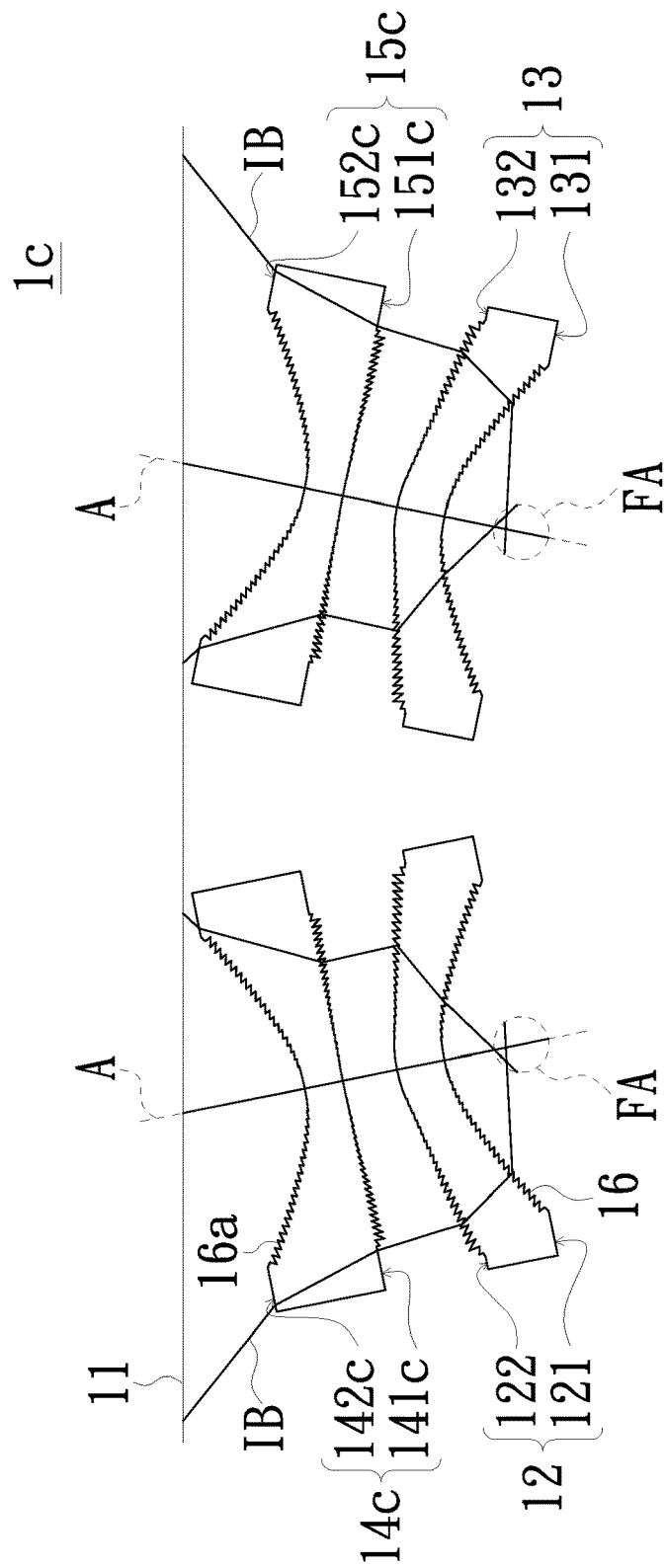
FIG. 5 is a schematic view of a head mounted display device in accordance with another embodiment of the invention.

Referring to FIG. 5, FIG. 5 is a schematic view of a head mounted display device in accordance with another embodiment of the invention. The head mounted display device 1c of FIG. 5 of the embodiment is substantially similar to the head mounted display device 1a of FIG. 3. A main difference lies in that the third surface 141c/151c of the second lens 14c/15c of the head mounted display device 1c of the embodiment is, for example, a plane surface, the fourth surface 142c/152c of the second lens 14c/15c is, for example, a concave surface. Namely, in the embodiment, the second lens 14c/15c is, for example, a plane-concave lens with negative refractive power. Specifically, in the embodiment, the concave surface of the second lens 14c/15c faces, for example, the display panel 11, and the plane surface of the second lens 14c/15c faces, for example, the focus area FA; but the invention is not limited thereto. In another embodiment, the concave surface of the second lens 14c/15c faces, for example, the focus area FA, and the plane surface of the second lens 14c/15c faces, for example, the display panel 11. Further, it is understood that the microstructures 16a may be selectively disposed on at least one of the third surface 141c/151c and the fourth surface 142c/152c of the second lens 14c/15c, and the invention is not limited thereto.

Figure 6:
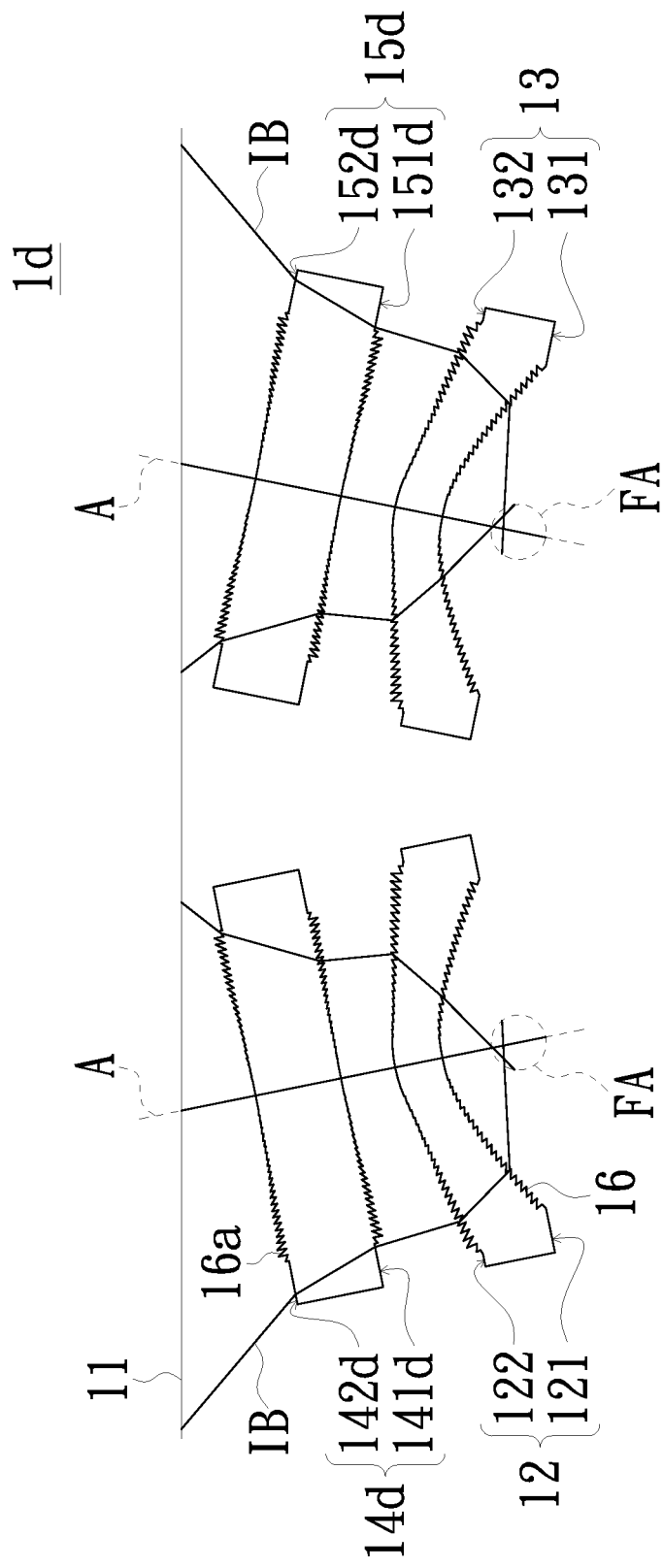
FIG. 6 is a schematic view of a head mounted display device in accordance with another embodiment of the invention.

Referring to FIG. 6, FIG. 6 is a schematic view of a head mounted display device in accordance with another embodiment of the invention. The head mounted display device 1d of FIG. 6 of the embodiment is substantially similar to the head mounted display device 1a of FIG. 3. A main difference lies in that the third surface 141d/151d of the second lens 14d/15d of the head mounted display device 1d of the embodiment is, for example, a first plane surface, the fourth surface 142d/152d of the second lens 14d/15d is, for example, a second plane surface. Namely, in the embodiment, the second lens 14d/15d is, for example, a plane-plane lens with negative refractive power. Specifically, in the embodiment, the first plane surface of the second lens 14d/15d faces, for example, the focus area FA, and the second plane surface of the second lens 14d/15d faces, for example, the display panel 11; but the invention is not limited thereto. In another embodiment, the first plane surface of the second lens 14d/15d faces, for example, the display panel 11, and the second plane surface of the second lens 14d/15d faces, for example, the focus area FA. Further, it is understood that the microstructures 16a may be selectively disposed on at least one of the third surface 141d/151d and the fourth surface 142d/152d of the second lens 14d/15d, and the invention is not limited thereto. However, because the microstructures 16a have a negative refractive power, the second lens 14d/15d may not be required to have a negative refractive power so that the manufacturing difficulty of the second lens 14d/15d may be reduced.

However, the types of the second lens shown in FIGS. 1 and 4-6 such as convex-concave, biconcave (concave-concave), plane-concave or plane-plane lenses may be selectively used with each other; in other words, the invention does not limit that the second lens uses only one type of lens. For example, in the head mounted display device 1 of FIG. 1, the second lens 14 may be a convex-concave lens and the second lens 15 may be a biconcave (concave-concave) lens.

Figure 7:
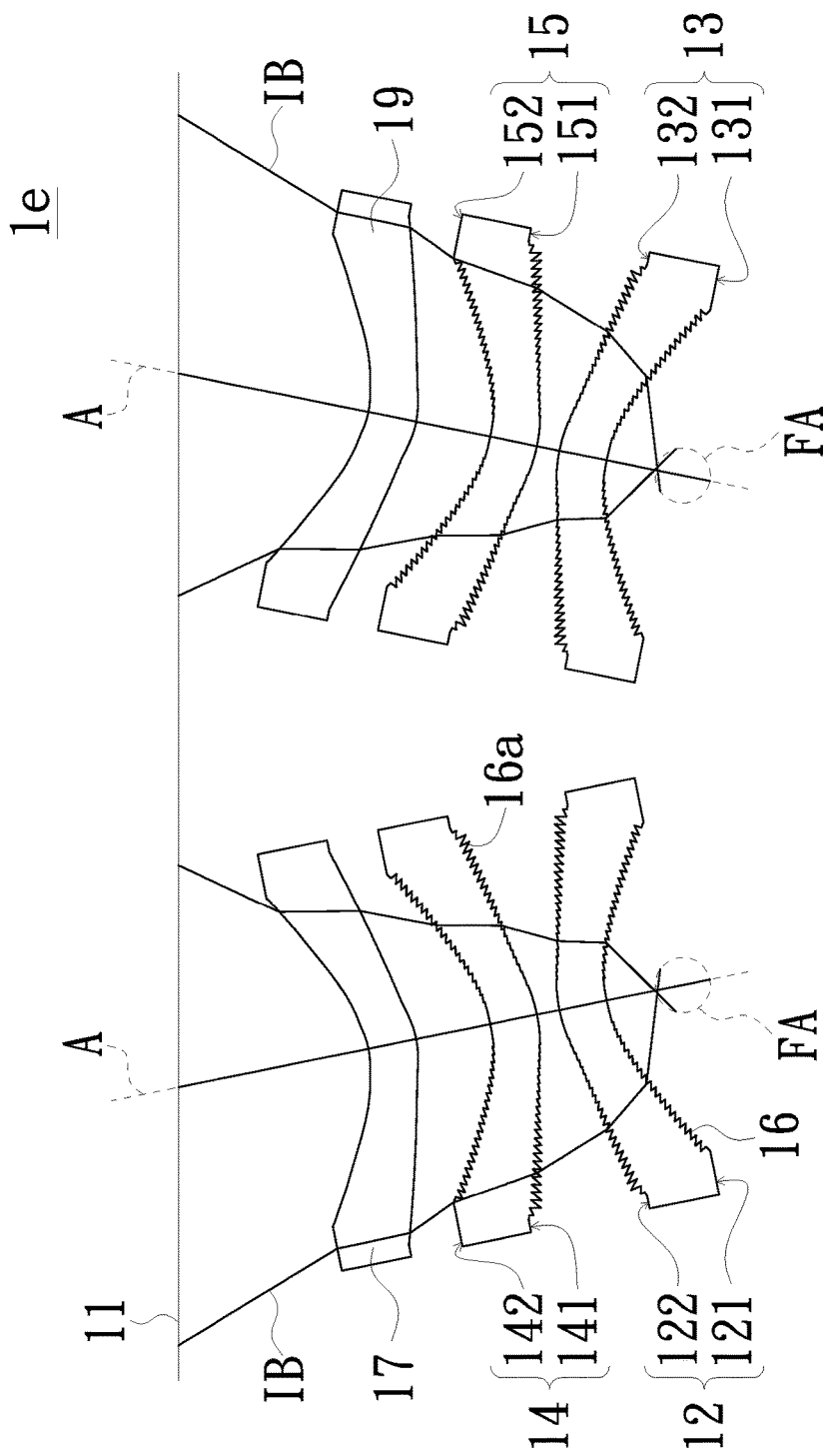
FIG. 7 is a schematic view of a head mounted display device in accordance with another embodiment of the invention.

Referring to FIG. 7, FIG. 7 is a schematic view of a head mounted display device in accordance with another embodiment of the invention. The head mounted display device 1e of FIG. 7 of the embodiment is substantially similar to the head mounted display device 1a of FIG. 3. A main difference lies in that the head mounted display device 1e of the embodiment further includes two optical compensation lenses 17 and 19. The optical compensation lens 17/19 is configured to allow the image beam IB emitted from the display panel 11 to pass through; the optical compensation lens 17 is disposed between the display panel 11 and the second lens 14, and the optical compensation lens 19 is disposed between the display panel 11 and the second lens 15. In the embodiment, the main effect of the optical compensation lens 17/19 is: the imaging quality is improved after the image beam IB is compensated by the optical compensation lens 17/19. However, the invention does not limit the number of the optical compensation lens to two. In other embodiments, the number of the optical compensation lens may be one or more than two. Further, in response to actual requirements, the optical compensation lens(es) may be disposed between the second lens 14 and the display panel 11 or between the second lens 15 and the display panel 11. Further, in the embodiment, the optical compensation lens 17/19 is, for example, a convex-concave lens, but the invention is not limited thereto. In another embodiment, the optical compensation lens 17/19 may be one of a biconcave (concave-concave) lens, a plane-concave lens, and a plane-plane lens. Further, it is understood that the microstructures 16a may be selectively disposed on at least one of the third surface 141/151 and the fourth surface 142/152 of the second lens 14/15, and the invention is not limited thereto.

Figure 8:
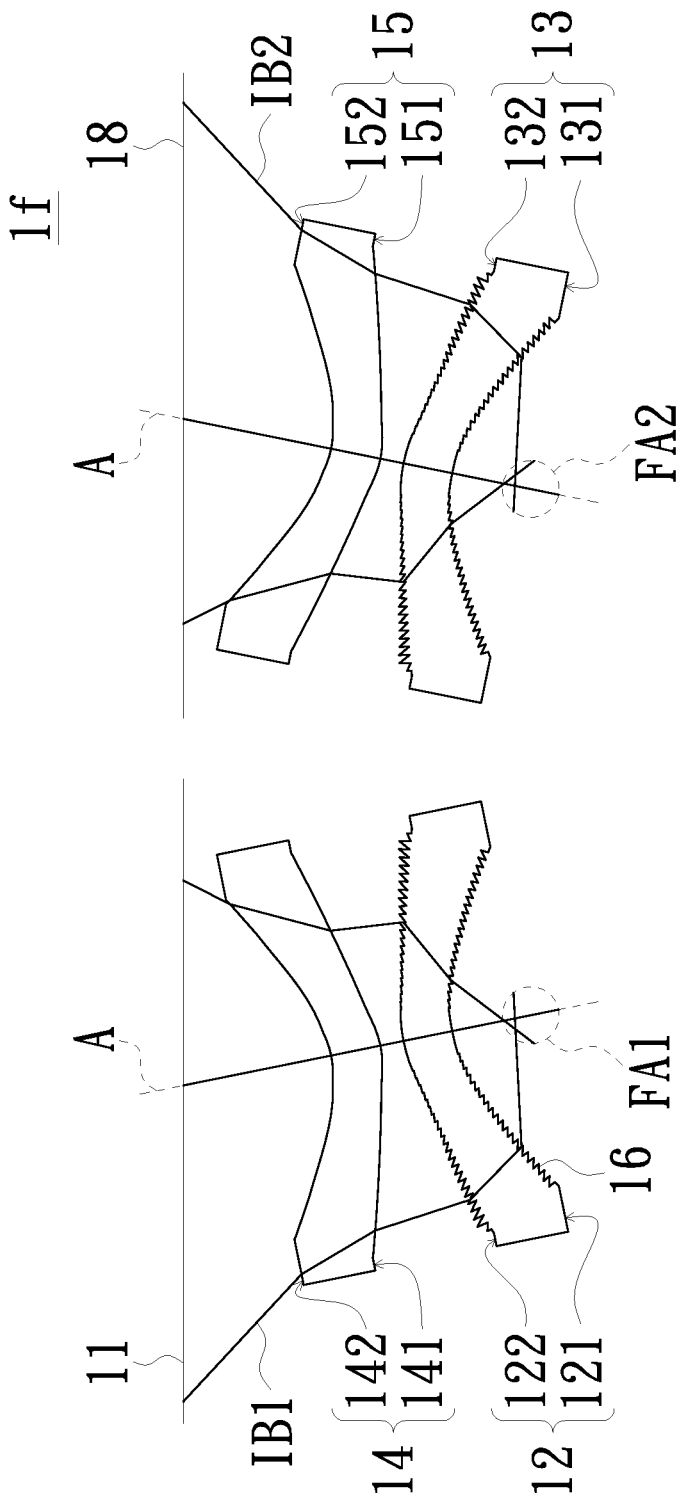
FIG. 8 is a schematic view of a head mounted display device in accordance with another embodiment of the invention.

Referring to FIG. 8, FIG. 8 is a schematic view of a head mounted display device in accordance with another embodiment of the invention. The head mounted display device if of FIG. 8 of the embodiment is substantially similar to the head mounted display device 1 of FIG. 1. A main difference lies in that the quantity of display panel of the head mounted display device if of the embodiment is, and the two display panels 11 and 18 are adapted to provide a first image beam IB1 and a second image beam IB2 respectively. The first image beam IB1 passes through the first lens 12/4 and forms a first focus area FA1 on the transmission path of the first image beam IB1. The second image beam IB2 passes through the first lens 13/15 and forms a second focus area FA2 on the transmission path of the second image beam IB2. Further, the microstructures 16a (not shown in FIG. 8) may be selectively disposed on at least one of the third surface 141/151 and the fourth surface 142/152 of the second lens 14/15, and the invention is not limited thereto.

Figure 9:
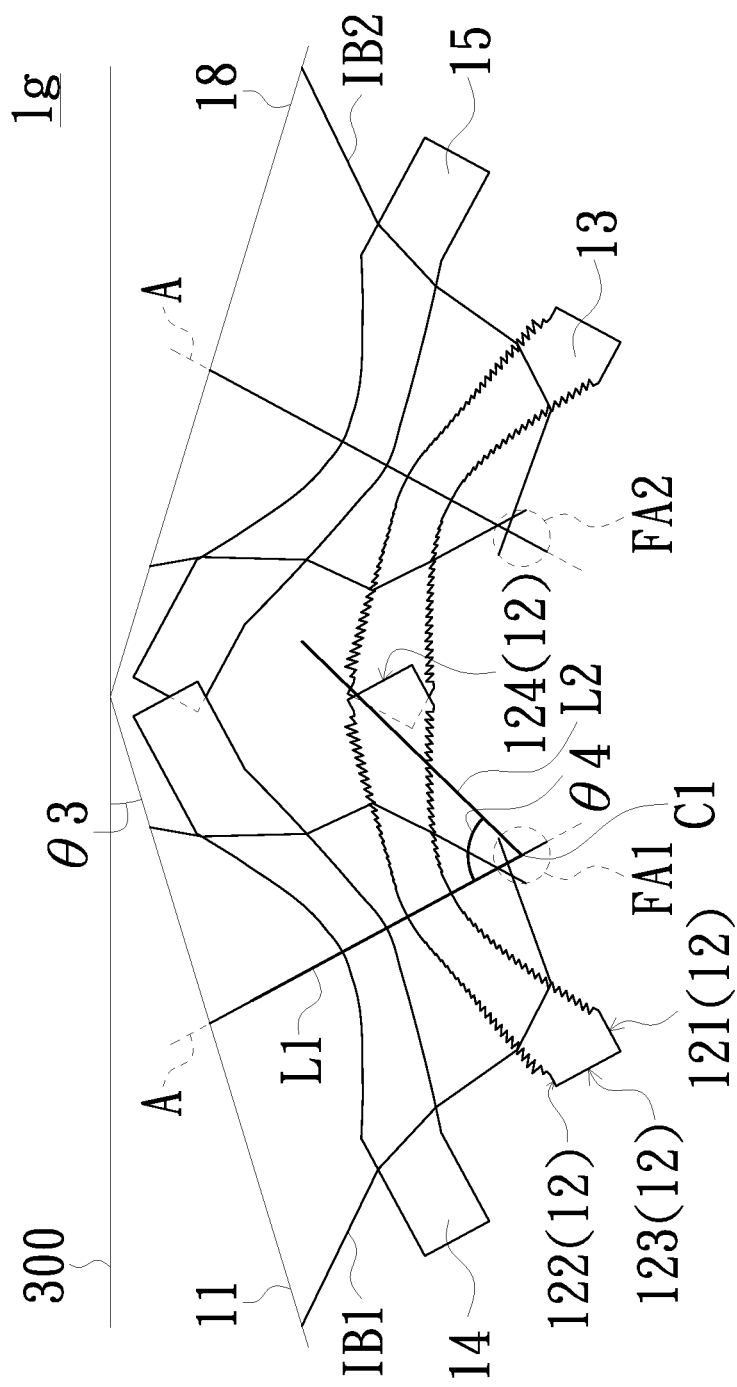
FIG. 9 is a schematic view of a head mounted display device in accordance with another embodiment of the invention.

Referring to FIG. 9, FIG. 9 is a schematic view of a head mounted display device in accordance with another embodiment of the invention. The head mounted display device 1g of FIG. 9 of the embodiment is substantially similar to the head mounted display device if of FIG. 8. A main difference lies in that the display panel 11/18 of the head mounted display device 1g of the embodiment inclines in a direction from a reference plane 300 to the first focus area FA1 and the second focus area FA2. Herein the display panel 11 is taken as an example. As shown in FIG. 9, an angle $\theta 3$ is formed between the display panel 11 and the reference plane 300; wherein the reference plane 300 may be a horizontal plane. When the display panel 11/18 is disposed on the reference plane 300, an angle is formed between the display panel 11/18 and the reference plane 300; wherein the reference plane 300 is defined as parallel to the direction of gravity. Herein the first lens 12 and the first focus area FA1 are taken as an example. As shown in FIG. 9, the first lens 12 includes a first side 123 and a second side 124 opposite to the first side 123. The first side 123 and the second side 124 are adjacent between the first surface 121 and the second surface 122. The head mounted display device 1g of the embodiment further includes a first reference line L1 and a second reference line L2. The first reference line L1 passes through the axis A of the first lens 12 and the center point C1 of the first focus area FA1. The second reference line L2 passes through the second side 124 and the center point C1 of the first focus area FA1. An angle $\theta 4$ is formed between the first reference line L1 and the second reference line L2; wherein the angle $\theta 4$ is greater than the angle $\theta 3$. Through the design, the chromatic aberration and the aberration of the optical system would be corrected effectively. However, the tilting angle of the display panel 11/18 relative to the reference plane 300 may be different, so that the user's eyes may have corresponding chromatic aberration or aberration correction with different levels. Further, the microstructures 16a (not shown in FIG. 9) may be selectively disposed on at least one of the third surface 141/151 and the fourth surface 142/152 of the second lens 14/15, and the invention is not limited thereto.

In summary, in the head mounted display device of the embodiment of the invention, the first lens close to the focus area formed by the image beam is designed as a curved surface, the concave surface of the first lens is designed to face the focus area, and a plurality of microstructures are designed to be disposed on the curved surface of the first lens, through the design, the field of view of the head mounted display device of the embodiment of the invention may be wider than 110 degrees without enlarging the size of lens. In addition, in the head mounted display device of the embodiment of the invention, the eye relief may be maintained greater than 100 mm while the field of view is increased. Further, the head mounted display device of the embodiment of the invention has lighter weight and smaller component size. Moreover, in the head mounted display device of the embodiment of the invention, though the structural design, the chromatic aberration and the aberration of the optical system may be corrected effectively.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A head mounted display device, adapted to emit an image beam, and adapted to form a focus area on a transmission path of the image beam, the head mounted display device comprising:
    at least one display panel, adapted to provide the image beam;
    two first lenses, adapted to allow the image beam to pass through, and disposed between the at least one display panel and the focus area, wherein each of the first lenses comprises a first surface and a second surface, the first surfaces are opposite to the second surfaces, and each of the first surfaces is a concave surface facing the focus area;
    two second lenses, adapted to allow the image beam to pass through, wherein each of the first lenses is disposed between each of the second lenses and the focus area; and
    a plurality of microstructures, disposed on at least one of the first surfaces and the second surfaces, wherein each of the first lenses has an axis, the microstructures comprise a first microstructure group disposed close to the axis and a second microstructure group disposed away from the axis, a first angle is formed between any two adjacent microstructures in the first microstructure group, a second angle is formed between any two adjacent microstructures in the second microstructure group, and the first angle is greater than the second angle.

2. The head mounted display device according to claim 1, wherein each of the first lenses has a positive refractive power.

3. The head mounted display device according to claim 1, wherein each of the second surfaces is a convex surface.

4. The head mounted display device according to claim 1, wherein the microstructures have a positive refractive power.

5. The head mounted display device according to claim 1, wherein the microstructures have a negative refractive power.

6. The head mounted display device according to claim 1, wherein each of the second lenses comprises a third surface and a fourth surface, the third surfaces are opposite to the fourth surfaces, the microstructures are disposed on at least one of the third surfaces and the fourth surfaces, and each of the second lenses has a negative refractive power.

7. The head mounted display device according to claim 6, wherein the third surface of the at least one second lens is a convex surface, the fourth surface of the at least one second lens is a concave surface, and one of the third surface having the convex surface and the fourth surface having the concave surface faces the focus area.

8. The head mounted display device according to claim 6, wherein the third surface of the at least one second lens is a first concave surface, the fourth surface of the at least one second lens is a second concave surface, and one of the first concave surface and the second concave surface faces the focus area.

9. The head mounted display device according to claim 6, wherein the third surface of the at least one second lens is a plane surface, the fourth surface of the at least one second lens is a concave surface, and one of the third surface having the plane surface and the fourth surface having the concave surface faces the focus area.

10. The head mounted display device according to claim 6, wherein the third surface of the at least one second lens is a first plane surface, the fourth surface of the at least one second lens is a second plane surface, and one of the first plane surface and the second plane surface faces the focus area.

11. The head mounted display device according to claim 1, wherein at least one of the first lenses is a spherical lens.

12. The head mounted display device according to claim 1, wherein at least one of the first lenses is an aspheric lens.

13. The head mounted display device according to claim 1, wherein at least one of the second lenses is a spherical lens.

14. The head mounted display device according to claim 1, wherein at least one of the second lenses is an aspheric lens.

15. The head mounted display device according to claim 1, wherein at least a portion of a surface of the microstructures is a spherical surface.

16. The head mounted display device according to claim 1, wherein at least a portion of a surface of the microstructures is an aspheric surface.

17. The head mounted display device according to claim 1, further comprising at least one optical compensation lens, wherein the at least one optical compensation lens is adapted to allow the image beam to pass through, and disposed between the at least one display panel and the second lenses.

18. The head mounted display device according to claim 1, wherein the at least one display panel inclines towards a direction by facing the focus area from a reference plane to form a third angle formed between the at least one display panel and the reference plane, at least one of the first lenses further comprises a first side and a second side, the first side is opposite to the second side, the first side and the second side are adjacent between the corresponding first surface and the corresponding second surface, the head mounted display device further comprises a first reference line and a second reference line, the first reference line passes through the axis of one of the first lenses and a center point of the focus area, the second reference line passes through the first side and the center point of the focus area or passes through the second side and the center point of the focus area, a fourth angle is formed between the first reference line and the second reference line, and the fourth angle is greater than the third angle.

19. The head mounted display device according to claim 1, wherein the number of the at least one display panel is two, the display panels are adapted to provide a first image beam and a second image beam respectively, the first image beam passes through one of the first lenses and one of the second lenses corresponding to each other to form a first focus area on a transmission path of the first image beam, the second image beam passes through another one of the first lenses and another one of the second lenses corresponding to each other to form a second focus area on a transmission path of the second image beam.

20. The head mounted display device according to claim 1, further comprising a frame, wherein the at least one display panel, the first lenses, and the second lenses are disposed on the frame.

* * * * *